May 22, 1962 C. A. GLASS 3,035,796
DUAL THRUST ROCKET BOOSTER TUBE
Filed Nov. 21, 1958 2 Sheets-Sheet 1
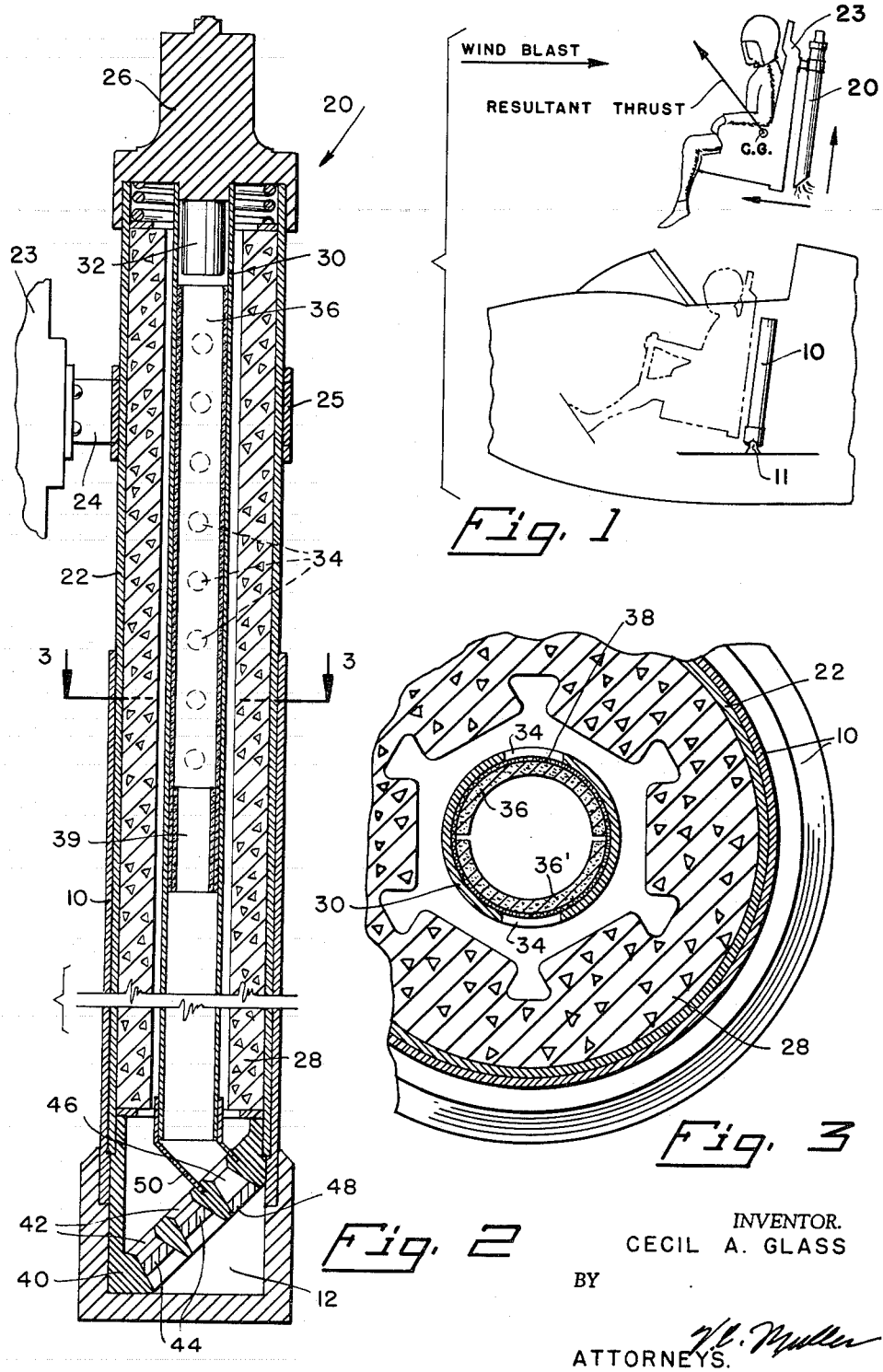
INVENTOR.
CECIL A. GLASS
BY
ATTORNEYS.

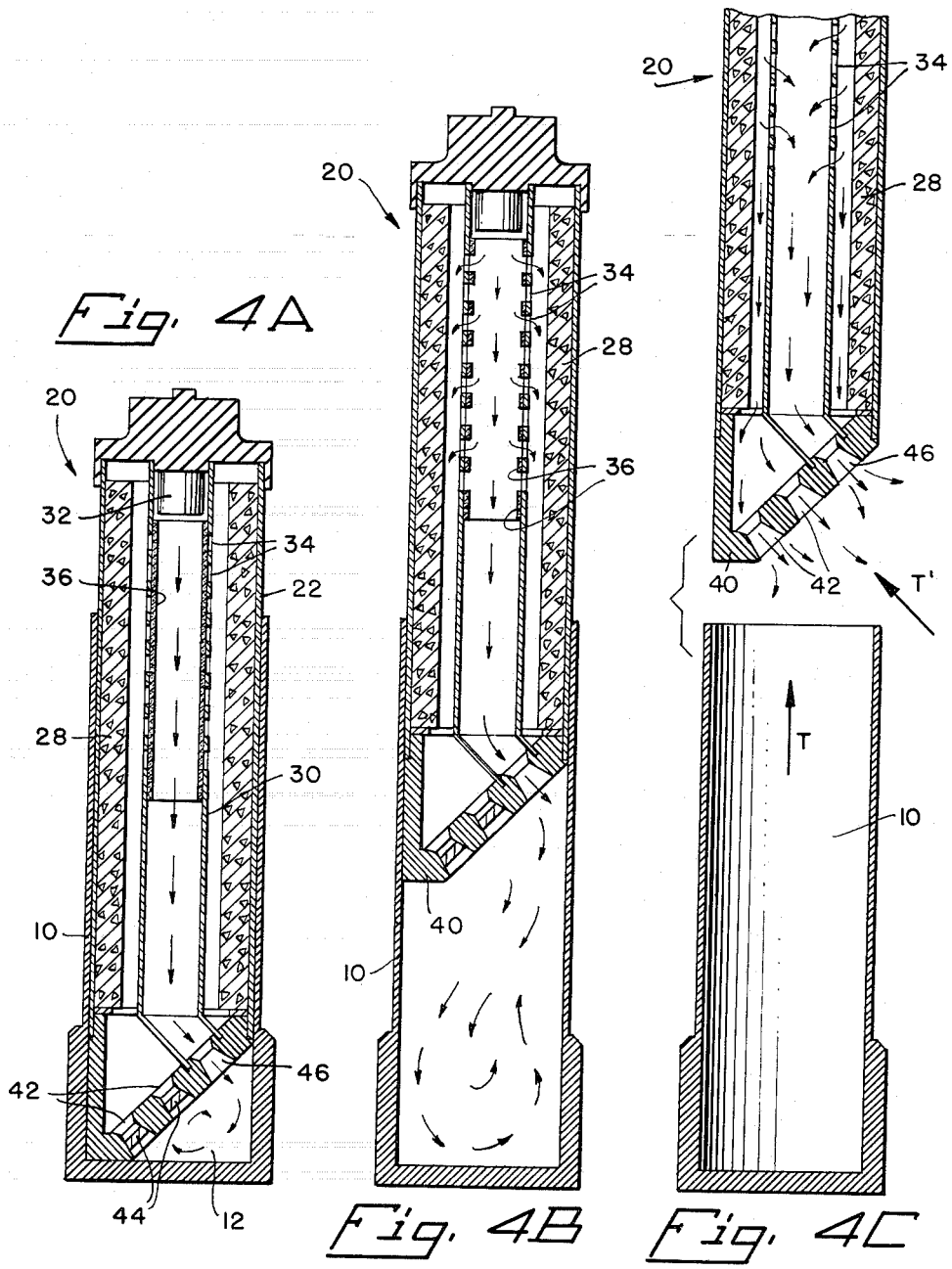

United States Patent Office 3,035,796
Patented May 22, 1962

3,035,796
DUAL THRUST ROCKET BOOSTER TUBE
Cecil A. Glass, China Lake, Calif., assignor to the United States of America as represented by the Secretary of the Navy
Filed Nov. 21, 1958, Ser. No. 775,662
4 Claims. (Cl. 244—122)
(Granted under Title 35, U.S. Code (1952), sec. 266)

The invention described herein may be manufactured and used by or for the Government of the United States of America for governmental purposes without the payment of any royalties thereon or therefor.

This invention relates to combined inner tube action and rocket action aircraft ejection seats and in particular to those ejection seats which incorporate the inner tube and rocket motor into a dual thrust single assembly.

FIG. 1 generally illustrates a typical combined tube action and rocket action ejection seat. It is used principally in connection with military aircraft. The term "tube action" and "rocket action" are derived from the two types of propulsion used in ejection. The seat is propelled the few feet necessary to leave the cockpit by tube action, that is, contained combustion gases within a launching tube working against a sliding member or piston which has a known area. In dual thrust rocket terminology this is called the "booster" phase of propulsion. After leaving the cockpit, the seat is propelled by free flight rocket action. In dual thrust rocket terminology this is called the sustainer phase of propulsion. It is the goal in the design of such ejection seats to provide free flight travel to an elevation permitting safe parachute escape, even when ejection is initiated at ground level, as in take-off and landing situations.

Two prior art devices are known and will be described. In one device the combustion gases for the booster or tube action are produced in a separate combustion chamber located externally of the launcher tube. The separate chamber leads into a port in the breech end of the launcher tube so that the combustion gases expand through the launcher tube. The piston and free flight rocket are combined in a single assembly which slideably engages within the launcher tube. Ignition of the free flight rocket is effected by a separate barrier assembly which is slideably engaged in the launcher tube and which travels outwardly with the piston. Initially in the tube action, this barrier prevents the hot combustion gases produced in the separate chamber from reaching the rocket nozzles. However, the barrier assembly contains a hole with a plug which is mechanically sheared off just prior to the piston and rocket motor assembly leaving the launcher tube. Hot gases pass through the hole and then into the rocket motor nozzle, igniting the free flight propellant. In this device the separate combustion chamber takes up critical space within the aircraft and adds to the cost of manufacture. The barrier assembly is a separate moving part, which increases the possibility of malfunction.

In another prior art device the combustion chamber for producing gases for the tube action, the combustion chamber for producing gases for the free flight rocket action, and the piston are combined into a single assembly. In other words the piston is also a dual thrust rocket. The two propellant charges are disposed in tandem, that is, one behind the other within the length of the rocket motor. In this device, the free flight propellant is ignited electrically by microswitch means, just prior to the time the rocket motor leaves the launcher. The tandem arrangement results in substantially less space for available rocket motor power. It is generally recognized that the envelope size available for a seat ejection power system is a space approximately 3½ feet long and having a 3-inch diameter.

The largest volume of sustainer propellant can be used by employing a cylindrical internal burning propellant grain having a central internal perforation extending between its ends which is bonded to or rests snugly against the motor tube on its outer (non-burning) surface. This propellant extends the full length of the rocket motor tube. With the tandem arrangement of this device, the "tube action" propellant takes up a substantial portion of the available motor tube length, leaving only a portion of length of the envelope for the sustainer grain, thereby preventing attainment of maximum power. Furthermore, in the present state of the art, this particular margin of power is very critical in attaining reliable ground level ejection capacity. Also, the separate microswitch circuit for igniting the free flight propellant grain increases the possibility of malfunction or involuntary firing.

A short discussion of free volume within the internal perforation of a cylindrical hollow grain will give a better understanding of the present invention. The free volume or void space within an internal burning propellant provides the exit channel for the passage of the products of combustion in reaching the nozzle. Depending upon the particular propellant and its configurations this free volume must equal 0.1 to 0.4 of the total volume of the combustion chamber for satisfactory performance. Anything affecting the use of this free volume as an exit channel, such as the presence of objects that otherwise occupy the space, causes unsatisfactory performance. The constriction of the exit channel causes an increase in velocity of the hot combustion gases resulting in excessive scrubbing and wearing of the propellant surface, which is termed "erosive burning" and subsequent excessive motor tube pressures.

Generally stated, the improvement of the present invention comprises a simplified economical structure which permits the combination of a booster tube or inner chamber, for producing the gases for the tube action, within the internal perforation of an elongated hollow internal burning grain, while later making effective use of the space occupied by the booster tube as free volume during sustainer grain firing. The effectiveness of the present invention is evident when it is realized that the typical internal burning propellant grain suitable for the above referred to envelope size has an internal perforation diameter of 1¼ inch. It has been found possible, as a result of this invention, to place a 1 inch O.D. booster tube inside this 1¼ inch internal perforation without causing unsatisfactory performance through erosion burning.

It is an object of the present invention to provide an upward directed aircraft ejection seat with booster tube and free flight rocket in the same assembly, with sufficient power to permit reliable ground level ejection capacity.

It is another object of the present invention to provide within an aircraft ejection seat system having a given envelope size for the booster and free flight propulsion means, more ejection power than heretofore available.

It is a further object of the present invention to provide a dual thrust rocket motor wherein a booster tube may be disposed within the internal perforation of an internal burning propellant grain without sacrificing the use of the space occupied by the booster tube as effective free volume during sustainer grain firing.

A still further object of the present invention is to provide within a dual thrust rocket a simple means, requiring no extra parts, for the timed ignition of the sustainer propellant.

Other objects and many of the attendant advantages of this invention will be readily appreciated as the same becomes better understood by reference to the following detailed description when considered in connection with the accompanying drawings wherein:

FIG. 1 illustrates the use of an aircraft ejection seat with the present invention, FIG. 2 is a longitudinal central section of the launcher tube, rocket motor tube, and booster tube assembly, FIG. 3 is an enlarged section taken along line 3—3 of FIG. 2, FIGS. 4A, 4B and 4C are sections like FIG. 2 illustrating sequential conditions during ejection.

The major components of a combined tube action and rocket action aircraft ejection seat will be apparent from an examination of the illustrative example shown in the drawing. A launcher tube 10 having a breech chamber 12 is secured to the aircraft frame by any suitable trunnion 11. A rocket motor assembly 20, having the double function of piston and thrust rocket motor, is slideably engaged within the launcher tube. The assembly includes the main motor tube 22, a smaller inner booster tube 30 and a nozzle assembly 40. The ejection seat 23 is rigidly attached to the motor tube 22 by means of a suitable bracket 24 and clamping ring 25.

Now referring to the rocket motor assembly 20 shown in FIGS. 2 and 3, the outer casing or motor tube 22, the nose cap 26, and the nozzle assembly 40, form a main combustion chamber for producing the sustainer or free flight combustion gases. The outer non-burning surface of a hollow cylindrical internal burning sustainer grain 28 is bonded to or rests snugly against the inside wall of the motor tube 22 and is mechanically supported in the combustion chamber to allow for thermal expansion by means of resilient spacers, springs or other structural devices known in the art.

A booster tube 30 is disposed within the central perforation of the propellant grain 28, its ends being rigidly secured to the nose cap 26 and nozzle assembly 40. The outer diameter of tube 30 is slightly smaller than the effective diameter of the propellant perforation so as to leave free volume within the main combustion chamber all around the booster tube. The end of the booster tube adjacent the nose cap 26 contains a conventional igniter 32 and is closed so that the booster tube forms a small inner combustion chamber for the production of the gases for the ejection of the rocket motor assembly and man seat out of the launcher. Although not shown in the drawing, suitable igniter firing accessories such as sear and firing pin may be incorporated into the nose cap. The booster tube has a plurality of apertures 34. At the start of ejection these apertures are covered by booster propellant strips 36, 36', as best shown in FIG. 3, which have a semi-circular section and are bonded to the inside wall of the booster tube. Thus the web thickness of these propellant strips form a membrane over the holes and only the inner surface of the propellant is exposed for burning within the booster tube. The choice of the particular booster propellant is dictated by the desired burning characteristics. Double base formulations having mesa-burning characteristics, i.e., uniform burning rate over a relatively wide temperature range have been found to work effectively. In the exemplary form, the strips are bonded to the inner wall by a bonding agent 38 consisting of cotton tape, as shown in FIG. 3, that had been dipped in polysiloxane adhesive. As is common in the art, inhibiting tape 39, bonded to the propellant, may be used to inhibit a portion of its exposed burning surface so as to obtain particular burning characteristics.

A multiport nozzle 40 containing several convergent divergent type nozzles 42 communicating to the main combustion chamber and a similar nozzle 46 communicating to the booster tube is secured to the end of the motor tube. The nozzle is canted at an angle which results in the axes of the nozzles passing near the center of gravity of the combined man-seat mass as shown in FIG. 1. The purpose of this is to avoid applying unwanted unbalanced torque to the man-seat combination which would otherwise cause undesired tumbling during free flight and secondly, to provide a forward thrust component to soften the rearward impact which occurs during a high speed ejection when the pilot is abruptly catapulted into a high speed wind blast as illustrated in FIG. 1. Nozzles 42 contain tightly fitted blow out plugs 44, which remain fixed in these nozzles until the sustainer propellant grain 28 is ignited. These plugs are made of a relatively heat resistant material such as aluminum and prevent premature ignition of the sustainer propellant grain by entry of hot tube gases into the main chamber through the nozzle ports. Nozzle 46 communicates with the booster tube through an elbow connection 50 for exhausting the combustion gases of the booster tube. A conventional nozzle closure diaphragm 48 made of neoprene, is similarly fitted into nozzle 46 to prevent dust or moisture from entering the booster tube.

It is to be understood that the pilot initiates seat ejection by actuating some conventional mechanism that fires the igniter 32 which in turn ignites the booster propellant strips 36, 36' within the booster tube. Typical flow paths of the combustion gases at this moment are shown by the arrows in FIG. 4A. Since the apertures 34 along the length of the booster 30 are covered by a membrane consisting of the propellant strips and since as a point of design the web thickness and strength of the propellant is designed to have an initial rupture strength greater than the booster tube combustion pressure, the gases are constrained to flow through the booster tube nozzle 46 into the launcher tube breech chamber 12. These gases will work against the rocket motor assembly 20 and provide the tube action while blow-out plugs 44 prevent these gases from entering nozzles 42. As understood in the art, the cockpit canopy is cast off, the pilot is constrained to the seat, and the seat, being rigidly secured to the rocket motor assembly 20, travels upwardly, guided by rails.

As the rocket motor assembly travels up the launcher tube, burning takes place normal to the exposed burning surfaces of the propellant strips 36, 36'. The rocket motor assembly 20 travels up the launcher tube until it reaches a point where it is within a few inches of leaving the tube as illustrated in FIG. 4B. At that moment the membrane over the booster tube apertures 34, consisting of the propellant strips 36, 36' rupture under the booster tube combustion pressure as the result of reduction in the web thickness of the propellant strips 36, 36' by burning. The precise timing of this event is predetermined by the choice of initial web thickness for a propellant strip having a given burning rate and given rupture strength characteristics. The flow paths of the combustion gases at this moment are shown by the arrows in FIG. 4B. A portion of the hot booster tube gases flow through holes 34 into the free volume within the main combustion chamber. This moment marks the beginning of the transition between tube action and rocket action. It is to be noted at this moment, just prior to ignition of the sustainer the blow-out plugs 44 are still in place and a portion of the booster gases is still exhausting through nozzle 46.

After a very brief ignition delay, for no more than the short time required for the piston and rocket motor assembly to travel the remaining few inches within the launcher tube, the sustainer propellant 28 ignites and blow-out plugs 44 are ejected from nozzles 42. The flow paths of the sustainer propellant combustion gases an instant after ignition are shown in FIG. 4C, the booster propellant strips having burned away. A portion of the gases exhaust through nozzles 42, passing through the free volumes between the burning surface of the propellant grain and the booster tube. Simultaneously another portion of the combustion gases passes through the apertures 34 into the booster tube and exhaust through booster tube nozzle 46, thus using the free volume of the booster tube during sustainer grain firing. This marks the end of the transition from tube action to rocket action and the combined pilot and seat is now propelled as a free flight reaction rocket vehicle and the direction of thrust has changed from the direction of arrow T to arrow T' wherein the resultant passes near the center of gravity as shown in FIG. 1.

After the ejection seat has been shot high enough to make a safe parachute escape, delay initiators release the pilot from the seat and his attached parachute automatically opens by means heretofore known in the art.

Obviously many modifications and variations of the present invention are possible in the light of the above teachings. It is therefore to be understood that within the scope of the appended claims the invention may be practiced otherwise than as specifically described.

I claim:

1. In apparatus for use in a tube action rocket action aircraft ejection seat having a launcher tube attached to the aircraft and rocket motor assembly attached to the seat and slideably engaged within the launcher tube; the improvement wherein said rocket motor assembly comprises; an elongated rocket motor tube, an internal burning cylindrical propellant grain disposed within the majority of the length of said motor tube having a central perforation extending between its ends, one end of said motor tube having a first nozzle means for exhausting combustion gases produced by said propellant grain when ignited, said first nozzle means having blow-out means which remain therein until said grain is ignited, the other end of said motor tube being closed, a booster tube disposed within said perforation, said booster tube having an igniter at the end thereof adjacent the closed end of said motor tube, and having at the other end thereof second nozzle means for exhausting combustion gases, said second nozzle means being adjacent said first nozzle means, said first and second nozzle means being constructed and arranged to exhaust angularly to the longitudinal axis of the motor tube to produce a component of thrust passing through the seat, said booster tube having a plurality of apertures along the length thereof and extending through its walls, said apertures being closed with strips of propellant fixed to the inner surface of said booster tube, said igniter being operable to ignite said strips of propellant for producing combustion gases, said combustion gases produced by said strips of propellant being operable to cause said rocket motor assembly to travel out of the launcher tube, said strips of propellant being further adapted to form a membrane over said apertures and prevent combustion gases produced by said strips from passing through said apertures until said rocket motor assembly has moved to a predetermined position along said launching tube at which position said strips of propellant are adapted to rupture and permit hot combustion gases produced by said strips to pass through said apertures, said hot gases passing through said apertures being operable to effect the ignition of said propellant grain, the combustion gases produced by said propellant grain being operable to produce thrust to project the seat away from the aircraft after said rocket motor assembly leaves the launcher tube, a portion of said combustion gases produced by said propellant grain after ignited adapted to pass through the apertures in the booster tube whereby gas is simultaneously exhausted through said first and second nozzle means.

2. In an aircraft seat ejection system having a launcher tube secured to the aircraft, a piston assembly slideably engaged in the launcher tube and a seat fixedly attached to the piston assembly, the piston assembly being further adapted to provide combustion gases for the ejection of the piston assembly out of the launcher tube and combustion gases for reacting rocket free flight after the piston assembly leaves the launcher tube; the improvement wherein said piston assembly comprises, an elongated main combustion chamber having a first propellant grain therein and adapted to produce said combustion gases for reaction rocket free flight, an elongated inner combustion chamber having a second propellant therein and adapted to produce the said combustion gases for the ejection of the piston assembly out of the launcher tube, said inner chamber being disposed concentrically within the main chamber and directly communicating with the interior of said launcher tube to pressurize same with gases produced by said second propellant, aperture means extending through the wall of the inner chamber, said aperture means adapted to be closed at the time ejection starts, means for opening the aperture means after the piston assembly has traveled a predetermined distance along the launcher tube thereby permitting the combustion gases produced in the inner chamber to pass into and ignite the propellant in the main combustion chamber, said aperture means being further adapted to permit a portion of the gases produced in the main chamber to pass into and exhaust through the inner chamber; and nozzle means to exhaust said combustion gases for free flight constructed and arranged to exhaust angularly to the longitudinal axis of said elongated combustion chamber to produce a component of thrust passing through said seat.

3. A piston assembly as described in claim 2 wherein said aperture means comprises a plurality of apertures and the means for opening the aperture means comprises said second propellant being formed from strip propellant having a predetermined initial web thickness mounted over the apertures on the inside surface of the inner chamber, the strip propellant being adapted to act as a membrane in closing the apertures to passage of combustion gases produced in the chamber into the main combustion chamber at the start of ejection and being further adapted to rupture at a predetermined time after the start of ejection as a result of the decrease in membrane web thickness and strength resulting from burning.

4. A piston assembly as described in claim 3 wherein said nozzle means comprises a nozzle communicating with the main chamber for exhausting combustion gases produced therein, said nozzle initially closed by a blow-out plug to prevent premature ignition of the main chamber propellant by entry of gases produced in the inner chamber therethrough, and a nozzle communicating with the inner chamber for exhausting the gases produced therein and exhausting said portion of the gases produced in the main chamber which exhaust through the inner chamber.

References Cited in the file of this patent

UNITED STATES PATENTS

| | | |
|---|---|---|
| 2,434,652 | Hickman | Jan. 20, 1948 |
| 2,724,237 | Hickman | Nov. 22, 1955 |
| 2,814,179 | Edelman et al. | Nov. 26, 1957 |
| 2,869,463 | McKnight | Jan. 20, 1959 |
| 2,877,504 | Fox | Mar. 17, 1959 |
| 2,900,150 | Hirt et al. | Aug. 18, 1959 |

OTHER REFERENCES

Aviation Week Magazine, Nov. 12, 1956, vol. 65, No. 20, pages 71, 72, 74 and 77 relied upon.